Patented Aug. 25, 1925.

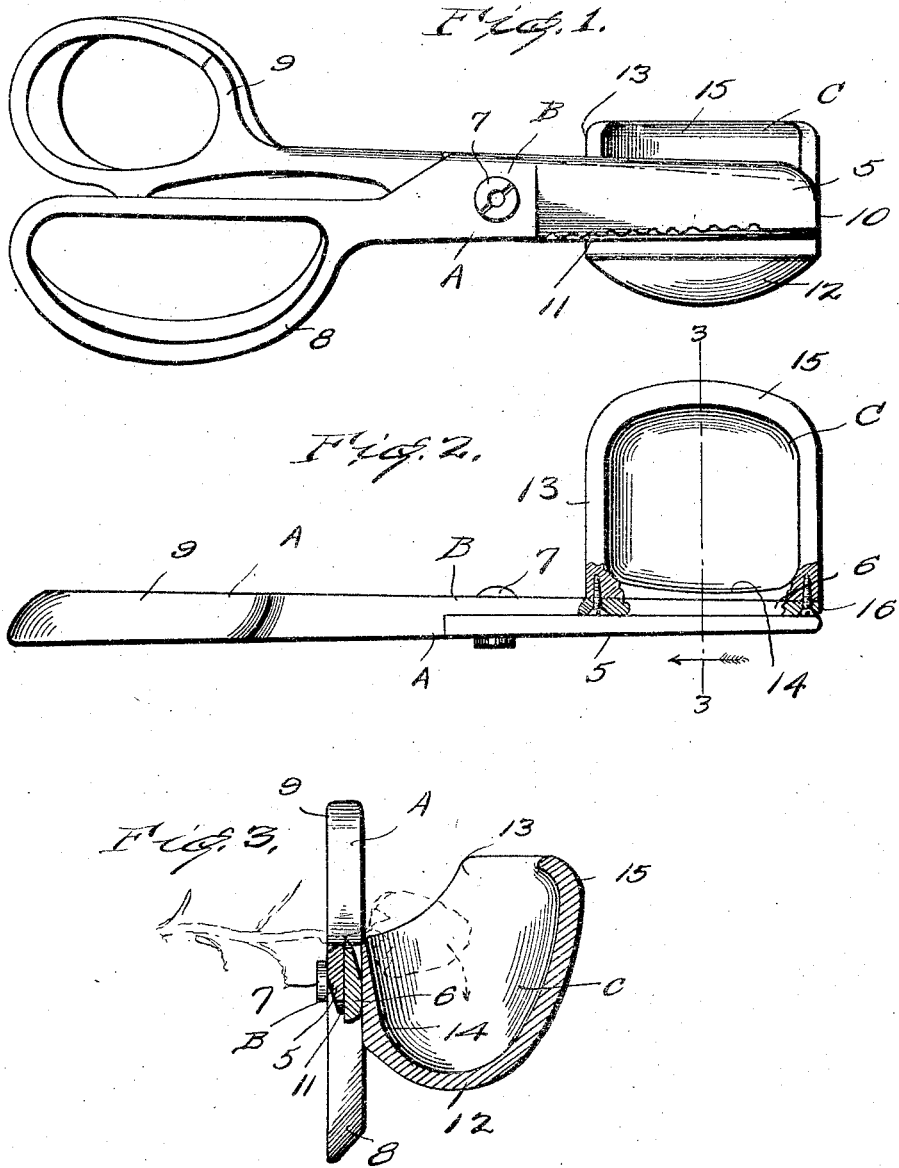

1,551,057

UNITED STATES PATENT OFFICE.

PERCY G. ROBINSON, OF MISSOULA, MONTANA.

STRAWBERRY PICKER.

Application filed March 24, 1923. Serial No. 627,406.

*To all whom it may concern:*

Be it known that I, PERCY GUY ROBINSON, a citizen of the United States, residing at Missoula, in the county of Missoula and State of Montana, have invented certain new and useful Improvements in a Strawberry Picker, of which the following is a specification.

This invention relates to a novel device for picking small fruit and berries and embodies means whereby the berries can be conveniently and expeditiously picked without the contacting of the hands with the berries, thereby insuring the cleanliness of the berries and the preventing the staining of the fingers of the picker of the berries.

A further object of the invention is to provide an improved berry picker, in which the stems of the berries can be cut with a clean stroke, without the injury to the plant, as is common, when the berry stem is broken by the fingers.

A still further object of the invention is to provide an improved berry picker, which will protect the hands of the picker and prevent sore fingers and the like.

A further object of the invention is to provide a berry picker embodying a pair of cutting scissors having relatively short cutting blades and relatively large manipulating handles, one of said blades carrying a bowl or receptacle for receiving the picked berries and the other blade having means formed thereon for preventing the slipping of the berry stems during the picking operation.

A still further object of the invention is to provide an improved berry picking device of the above character, which will be durable and efficient in use, one which will be simple and easy to manufacture, and one which can be placed upon the market at a reasonable cost.

With these and other objects in view, the invention consists in the novel construction, arrangement and formation of parts, as will be hereinafter more specifically described, claimed and illustrated in the accompanying drawings, forming a part of this specification, in which drawings:

Figure 1 is a side elevation of the improved berry picking device.

Figure 2 is a plan view of the same, showing parts of the device in section to illustrate the means employed for connecting the berry receiving bowl with one of the cutting blades of the device.

Figure 3 is a transverse section through the improved device, taken on the line 3—3 of Figure 2.

Referring to the drawings in detail wherein similar reference characters designate corresponding parts throughout the several views, the letter A generally indicates the improved berry picking device, which embodies the cutting member B and the berry receiving member C. The berry stem cutting member B is in the nature of a pair of scissors or shears and embodies a pair of relatively short blades 5 and 6, which are pivotally connected at their rear ends by means of a pivot bolt or the like 7. Formed on the rear terminals of the blades are the relatively large handles 8 and 9. As shown the handles 8 and 9 extend a greater distance from the pivot bolt 7 than do the terminals of the blades 5 and 6. The handle 8 is shaped, as is the usual scissor handle for receiving the fingers of the user of the device, while the handle 9 is shaped to receive the thumb of the user of the device. Owing to the size of the handles 8 and 9 and the distance therefrom from the pivot bolt 7, the operation of the cutting blades 5 and 6 is of course rendered easy. In view of the fact that the points on the scissors are unnecessary, the terminals thereof end in abrupt faces 10 and in the same plane as the side or end wall of the berry receiving bowl or receptacle C. The inner edges of the blades 5 and 6 are sharpened and the sharpened edge of the blade 5 is notched or provided with teeth 11, so as to prevent the slipping of the stem of the fruit from between or along the cutting edges of the blades when the device is in use.

The receptacle C is preferably formed of wood or the like, so that the berries will not contact with any metal which would tend to rupture the berry. As shown the receptacle C includes the lower wall 12, the end walls 13, the attaching inner wall 14 and the outer curved wall 15. Suitable screws or the like 16 extend through the blade 6 into the receptacle C as clearly shown in Figure 2 of the drawings.

It is obvious that as the stems of the berries are cut through by the blades 5 and 6, that the same will fall into the receptacle or bowl C and that when this bowl is full of berries, the same can be conveniently poured from the bowl, the wall 15 forming a guide for the same. The berries are of course preferably dumped directly into the quart boxes in which they are usually shipped and sold.

From the foregoing description, it can be seen that an improved device for picking berries has been provided, which will not only expedite the work, but prevent injury to the berries.

Changes in details may be made without departing from the spirit or the scope of this invention.

What I claim as new is:—

As a new article of manufacture, a fruit picking device comprising a pair of scissors including a pair of relatively short blades, a handle for each blade and a pivot bolt connecting the blades together, a berry catching device carried by one blade and projecting laterally therefrom, said berry catching device including a bowl shaped body having a flat inner wall fitted snugly up against said blade terminating substantially in the same plane with the sharpened edge thereof.

In testimony whereof I affix my signature.

PERCY G. ROBINSON.